United States Patent [19]

Bell, III

[11] Patent Number: 4,876,980
[45] Date of Patent: Oct. 31, 1989

[54] FISHING ROD HOLDER EXTENSION

[76] Inventor: Randall R. Bell, III, 4135 Baisden Dr., Pensacola, Fla. 32503

[21] Appl. No.: 274,834

[22] Filed: Nov. 22, 1988

[51] Int. Cl.$^4$ .................... A01K 97/00; B63B 17/00
[52] U.S. Cl. .................................... 114/364; 114/255; 43/21.2; 43/27.4; 43/42.74; 224/42.45 R; 224/922; 248/538
[58] Field of Search ............... 43/19.2, 21.2, 23, 27.4, 43/42.74; 224/42.45 R, 922; 248/514, 534, 538; 114/255, 343, 364

[56] References Cited

U.S. PATENT DOCUMENTS

| | | | |
|---|---|---|---|
| 278,973 | 6/1883 | Kizer | 248/514 |
| 3,665,633 | 5/1972 | Scott | 43/19.2 |
| 3,964,706 | 6/1976 | Adams | 43/21.2 |
| 3,975,854 | 8/1976 | Graham | 43/19.2 |
| 4,388,774 | 6/1983 | Thoemke | 43/21.2 |
| 4,468,878 | 9/1984 | Maher | 43/21.2 |
| 4,485,579 | 12/1984 | Hawie | 43/21.2 |
| 4,753,029 | 6/1988 | Shaw et al. | 248/538 |
| 4,778,141 | 10/1988 | Bogar | 43/21.2 |

FOREIGN PATENT DOCUMENTS 8620 of 1898 United Kingdom ................ 248/514

Primary Examiner—Nicholas P. Godici
Assistant Examiner—William Scott Andes
Attorney, Agent, or Firm—Fleit, Jacobson, Cohn, Price, Holman & Stern

[57] ABSTRACT

A generally Z-shaped tubular member is provided including a pair of laterally and longitudinally offset parallel legs interconnected by an angulated arm extending between and interconnecting adjacent ends of the legs. One of the legs is downwardly telescopically receivable in an upwardly opening and rearwardly and outwardly inclined fishing rod holder on a boat gunnel and the handle end of a fishing rod is removably and downwardly telescopically receivable in the other leg, the arm of the tubular member projecting outwardly of the associated boat gunnel and the tubular member functioning to laterally outwardly offset the mounting location of the associated fishing rod relative to the boat gunnel.

12 Claims, 1 Drawing Sheet

U.S. Patent
Oct. 31, 1989
4,876,980
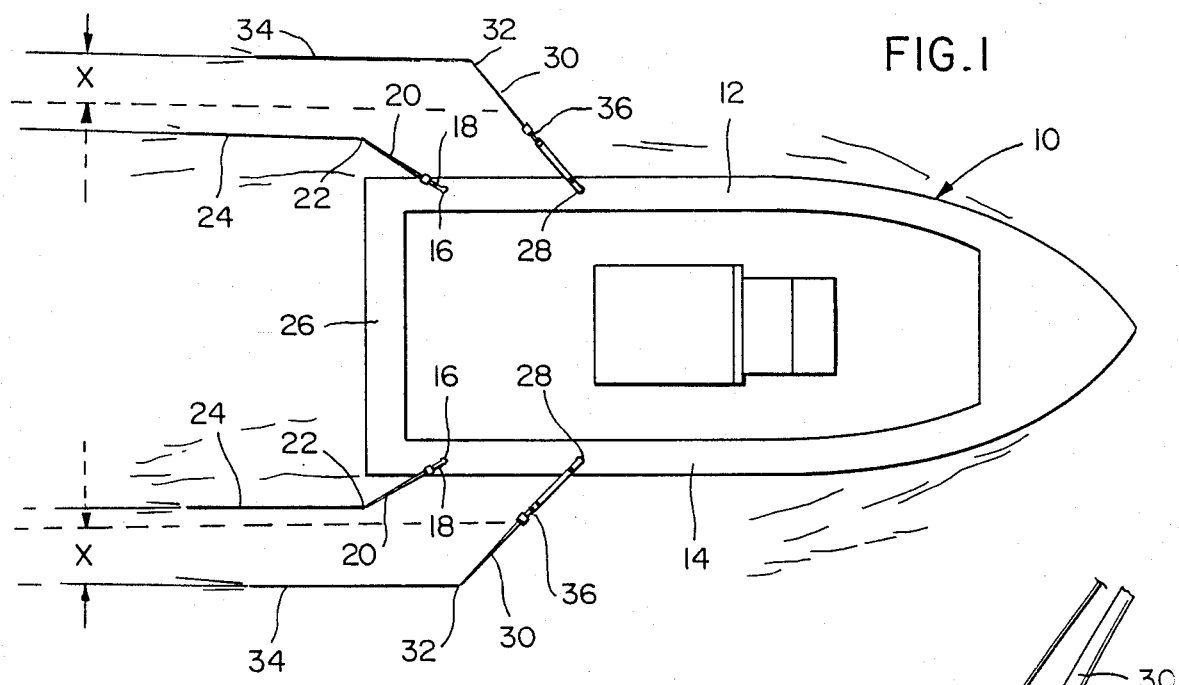
FIG. 1
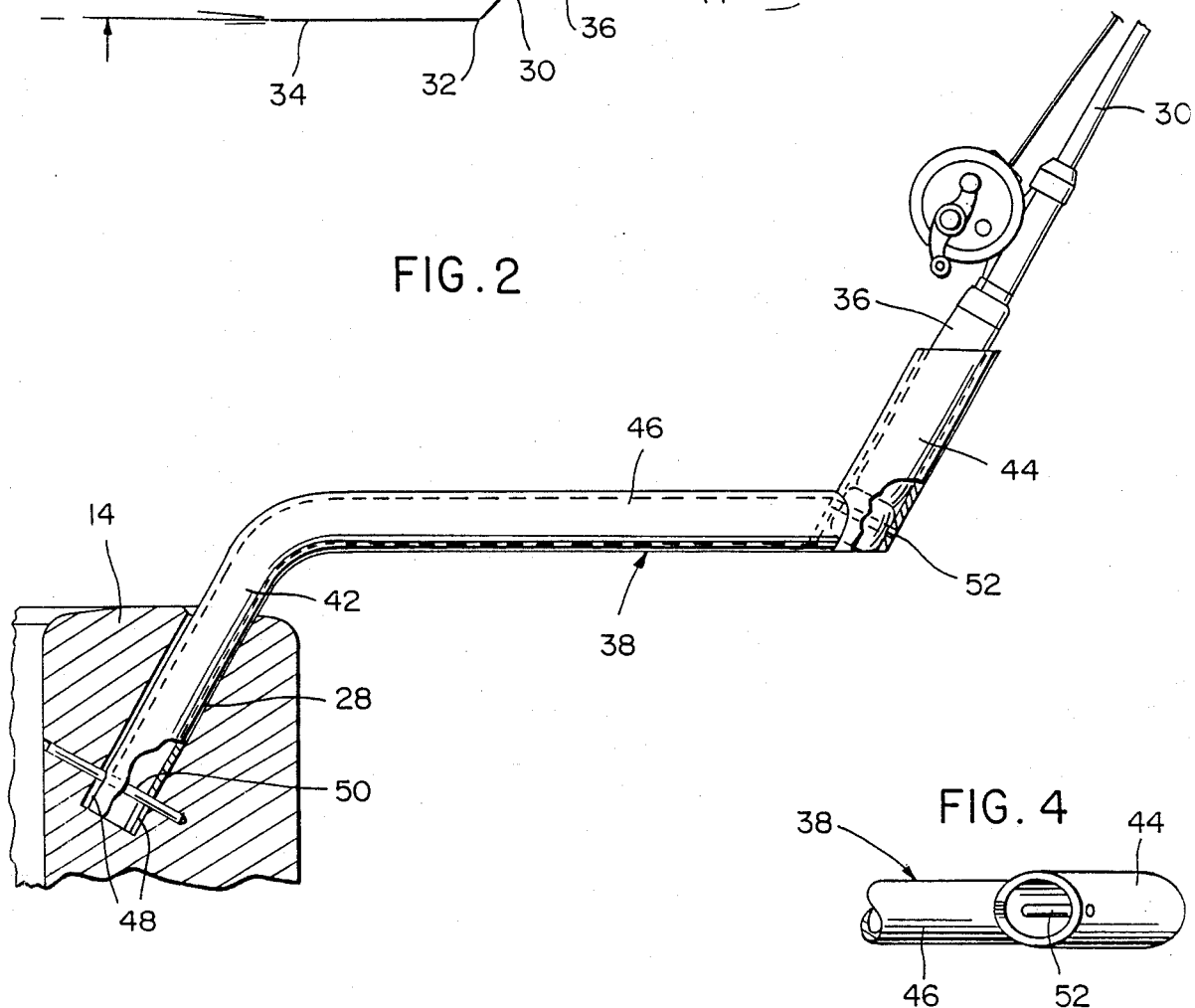
FIG. 2
FIG. 4
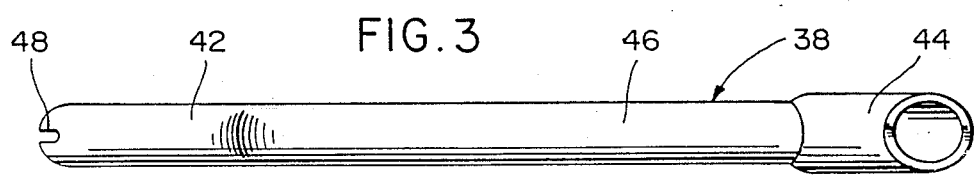
FIG. 3

FISHING ROD HOLDER EXTENSION

BACKGROUND OF THE INVENTION

1. Field of the Invention

A generally Z-shaped extension structure is provided including a pair of laterally and longitudinally offset parallel tubular legs interconnected by a straight tubular connecting arm extending between and interconnecting the adjacent ends of the legs. The free end of one leg is removably downwardly telescopically receivable within a rearwardly and outwardly inclined upwardly opening boat gunnel socket and the handle end of a fishing rod is removably downwardly telescopically receivable within the free end of the other leg, the extension structure being designed to be used in conjunction with a forward boat gunnel rod holder and to support a fishing rod therefrom in a manner such that the tip end of the supported rod is spaced considerably outward of the tip end of a similar fishing rod supported directly from an aft fishing rod holder on the same boat gunnel independent of a similar extension structure.

DESCRIPTION OF RELATED ART

Various different form of rod holders including holders for rods disposed at different angles, retractable rod holders and other similar devices heretofore have been disclosed in U.S. Pat. Nos. 3,665,633, 3,975,854, 4,388,774, 4,468,878, 4,485,579 and 4,753,029. However, these previously known devices do not include the overall structural combination of structural features included in the instant invention.

SUMMARY OF THE INVENTION

A typical trolling-type fishing boat of small to medium size usually is provided with two rod holders spaced along each gunnel. The aft rod holder on each gunnel is inclined upwardly and rearwardly, either in a substantially straight rearwardly and upwardly inclined position or also slightly inclined outwardly of the corresponding gunnel. The forward rod holder on each gunnel is also inclined rearwardly and upwardly, but is inclined further outward of the corresponding gunnel.

With rod holders of this type, the tips of identical fishing rods supported from the rod holders along each gunnel are laterally spaced apart relative to the longitudinal center line of the associated boat, but the lateral spacing provided usually is not sufficient to prevent two associated fishing lines from becoming tangled during trolling operations.

In order to insure that such fishing lines utilized for trolling purposes do not become tangled, some fishermen utilize outriggers for the fishing lines supported from the forward rod holders. Such outriggers usually comprise long poles of approximately 12′ to 20′ in length and the fishing lines of the forwardmost fishing rods are engaged by clamps supported from followers which may be moved longitudinally of the outrigger poles. Although the use of outriggers of this type will substantially prevent two fishing lines on the same side of a boat from becoming tangled during trolling operations, outriggers are difficult to set up and take down, especially in rough water conditions, and they are also cumbersome and troublesome during normal usage. Still further, the expense of durable outriggers is appreciable.

Accordingly, a need exists for structure by which fishing lines of two fishing rods supported from forward and aft fishing rod holders along a boat gunnel may be sufficiently laterally spaced apart to prevent the associated fishing lines from becoming tangled during trolling operations and with such structure being readily adaptable to substantially all types of fishing boats.

The main object of this invention is to provide a fishing rod holder extension which may be used in conjunction with substantially all gunnel mounted fishing rod holders.

Another object of this invention is to provide an extension in accordance with the preceding object and which will be easy to set up and take down during rough water conditions.

Still another object of this invention is to provide a fishing rod holder extension which may be used in conjunction with substantially all fishing rods designed to be used during trolling operations.

A final object of this invention to be specifically enumerated herein is to provide a fishing rod holder in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is top plan view of a typical fishing boat including fore and aft fishing rod holders spaced along each gunnel and with a fishing rod holder constructed in accordance with the present invention being utilized in conjunction with each fore fishing rod holder and an associated fishing rod;

FIG. 2 is an enlarged elevational view of the starboard forward fishing rod holder and the associated extension, part of the extension being broken away and illustrated in vertical section and the handle end of a fishing rod being operatively associated with the outer end of the holder;

FIG. 3 is a top plan view of the extension illustrated in FIG. 2; and

FIG. 4 is a fragmentary bottom plan view of the right side portion of the extension illustrated in FIG. 3.

DESCRIPTION OF THE PREFERRED EMBODIMENT

With reference now more specifically to FIG. 1 of the drawings, the numeral 10 generally designates a small to medium size fishing boat including port and starboard gunnels 12 and 14. Each of the gunnels 12 and 14 includes an aft upwardly opening and rearwardly and outwardly inclined socket 16 defining a rod holder for the handle end 18 of a fishing rod 20 and the tip ends 22 of the fishing rods 20 are spaced slightly outward of the gunnels 12 and 14 of the boat 10 in a manner such that the fishing lines 24 extending rearwardly therefrom during trolling operations are spaced on opposite sides of the center of the wake of the fishing boat 10 and the maximum water turbulence behind the boat 10. The sockets 16, in some cases, are merely inclined rearwardly and upwardly, if the beam of the boat 10 at the transom 26 is sufficient to space the lines 24 from the maximum turbulence zone of the boat wake without also upwardly and outwardly inclining the socket 16. Each gunnel 12 and 14 additionally includes a forward socket 28 and the sockets 28 are also rearwardly and upwardly inclined, but are usually upwardly and outwardly inclined more than the sockets 16. Thus, when fishing rods 30 substantially identical to the fishing rods 20 have their handgrip ends 36 received in the sockets 28, the tip ends 32 of the rods 30 are spaced at least somewhat outward of the tip ends 22 of the rods 20. However, the usual lateral outward spacing of the tip ends 32 relative to the tip ends 22 when the rods 30 are supported from the sockets 28 is inadequate to prevent the lines 34 extending rearward from the fishing rods 30 from becoming entangled with the lines 24 during trolling operations.

Accordingly, fishing persons often equip their boats with outriggers of the type hereinbefore discussed, but such outriggers are troublesome to use, expensive and difficult to set up and take down during rough water conditions.

In order to increase the usual lateral spacing between corresponding lines 24 and 34, the extension referred to in general by the reference numeral 38 is provided. Each extension 38 includes a pair of substantially parallel and relatively longitudinally offset elongated first and second end portions or legs 42 and 44 interconnected by an angled connecting member or arm 46 extending between adjacent ends of the legs 42 and 44. The legs 42 and 44 are tubular, as is the arm 46, and the free end of the leg 42 includes diametrically opposite radial notches 48 formed therein and each socket 28 includes a diametric pin 50 whose opposite ends are received in the corresponding notches 48. Also, the end of the leg 44 joined to the arm 46 includes a diametric pin 52 corresponding to the associated pin 50.

From FIG. 2 of the drawings it may be seen that the leg 42 is downwardly telescopically received in the socket 28 with opposite end portions of the pin 50 seated in the notches 48 and that the handle end of the corresponding fishing rod 30 is removably, downwardly telescopically received within the tubular leg 44, the lower end of the handle end 36 being provided with a diametric slot opening inwise outwardly of the handle end and in which the diametric pin 52 is seated. Thus, the handle end 36 of the rod 30 is keyed to the tubular leg 44 against rotation relative thereto.

The effective length of the arms 46 determines the additional lateral spacing X between corresponding lines 24 and 34, exclusive of the additional outward inclination of the sockets 28. Accordingly, the additional spacing X between laterally adjacent fishing lines 24 and 34 is solely a result of the corresponding extension 38.

Of course, the rods 30 may be readily disengaged from the legs 44 and the extensions 38 may be readily disengaged from the sockets 28.

It is pointed out that the sockets 28 are somewhat schematically illustrated in that the gunnels 12 and 14 usually are not solid and the sockets 28 may be formed by cylindrical type fittings projecting downwardly through openings provided therefor in upper surfaces of the gunnels 12 and 14, such fittings usually being provided with enlarged mounting flanges overlying and anchored relative to such upper surfaces.

By utilizing the extensions 38 of the instant invention increased lateral spacing X may be gained between corresponding fishing lines 24 and 34. Such additional spacing usually is ample to prevent adjacent fishing lines 24 and 34 from becoming tangled during trolling operations.

The extensions 38 may be constructed of any suitable material such as marine grade aluminum, stainless steel or even heavy duty high strength plastic. In addition, the legs 42 and 44 of each extension 38 need not be precisely parallel nor disposed in the same plane. However, the use of legs 42 and 44 which are in the same plane with the associated arm 46 enables the extension 38 to be more compactly shipped and stored. Also, by maintaining the legs 42 and 44 substantially parallel, the angle of each leg 44 will be substantially identical to the angle of the corresponding socket 28, which angle sometimes is precisely engineered for a given make and model of boat.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In combination, a boat including opposite side gunnels, at least one of said gunnels including fore and aft spaced apart upwardly and outwardly inclined upwardly opening fishing rod handle receiving sockets, a first fishing rod including a handle end and a tip end, said handle end being removably telescopically received in said aft socket, a generally Z-shaped extension including substantially parallel and relatively longitudinally offset elongated first and second end portions and an angled connecting member extending between and rigidly interconnecting adjacent ends of said end portions, the end of one of said end portions remote from said connecting member being removably telescopically received in said fore socket, and a second fishing rod including handle and tip ends and having the handle end thereof removably telescopically received in the end of the other end portion of said extension remote from said connecting member.

2. The combination of claim 1 wherein said fore and aft sockets are also rearwardly and outwardly inclined relative to the longitudinal extent of said one gunnel.

3. The combination of claim 2 wherein said fore socket is rearwardly and outwardly inclined relative to said one gunnel more than said aft socket.

4. The combination of claim 1 wherein said aft socket and said handle end of said first fishing rod include coacting means releasably keying said first fishing rod handle end relative to said aft socket against rotation of said first fishing rod handle end in said socket.

5. The combination of claim 4 wherein said fore socket and said handle end of said second fishing rod include coacting means releasably keying said second fishing rod handle end relative to said fore socket against rotation of said second fishing rod handle end in said fore socket.

6. The combination of claim 5 wherein said fore and aft sockets are also rearwardly and outwardly inclined relative to the longitudinal extent of said one gunnel.

7. The combination of claim 6 wherein said fore socket is rearwardly and outwardly inclined relative to said one gunnel more than said aft socket.

8. The combination of claim 1 wherein said first and second end portion as well as said connecting member are of tubular construction.

9. The combination of claim 1 wherein said fore socket is rearwardly and outwardly inclined relative to the longitudinal extent of said one gunnel.

10. In combination with a boat including opposite side gunnels and a transom extending between and interconnecting the aft ends of said gunnels, at least one of said gunnels including an upwardly and outwardly inclined upwardly opening fishing rod handle receiving socket, a generally Z-shaped extension including substantially parallel and relatively longitudinally offset elongated first and second end portions and an angled connecting member extending between and rigidly connecting adjacent ends of said end portions, the end of one of said end portions remote from said connecting member being removably telescopically received in said socket, a fishing rod including handle and tip ends and having the handle end thereof removably telescopically received in the end of the other end portion remote from said connecting member.

11. The combination of claim 10 wherein said socket and handle end of said fishing rod include coacting means releasably keying said fishing rod handle end relative to said socket against rotation of said fishing rod handle in said socket.

12. The combination of claim 11 wherein said first and second end portions as well as said connecting member are of tubular construction.

* * * * *